United States Patent [19]

Ozeki

[11] Patent Number: 4,468,873
[45] Date of Patent: Sep. 4, 1984

[54] DESKTOP FILM VIEWER
[75] Inventor: Jiro Ozeki, Tokyo, Japan
[73] Assignee: Slidex Corporation, Tokyo, Japan
[21] Appl. No.: 402,070
[22] Filed: Jul. 26, 1982
[30] Foreign Application Priority Data Jan. 26, 1982 [JP] Japan ................................. 57-10446

[51] Int. Cl.³ ...................... G02B 27/02; G02B 27/04
[52] U.S. Cl. ....................................... 40/361; 40/367; 350/235; 350/238
[58] Field of Search .............................. 350/235–239; 40/361–362, 367

[56] References Cited
U.S. PATENT DOCUMENTS

| 2,503,550 | 4/1950 | Good | 350/238 |
| 2,602,253 | 7/1952 | Diamond | 40/367 |
| 3,039,350 | 6/1962 | Gollhofer | 350/238 |
| 4,426,798 | 1/1984 | Saunders | 40/361 |

FOREIGN PATENT DOCUMENTS 1112289 3/1956 France ................................. 40/367

Primary Examiner—William H. Punter
Attorney, Agent, or Firm—Fleit, Jacobson, Cohn & Price

[57] ABSTRACT

The disclosed film viewer comprises a box with a bottom and an inclined top having a diffusion plate fitted therein, a light source disposed in the box, and a number of reflectors distributed on the inner surface of the box so as to reflect light beams from the light source in such a manner that uniform brightness is provided throughout the entire surface of the diffusion plate.

5 Claims, 12 Drawing Figures

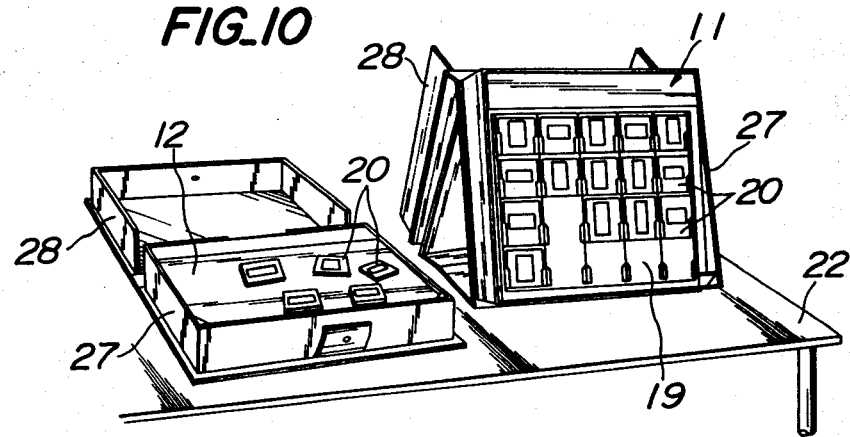
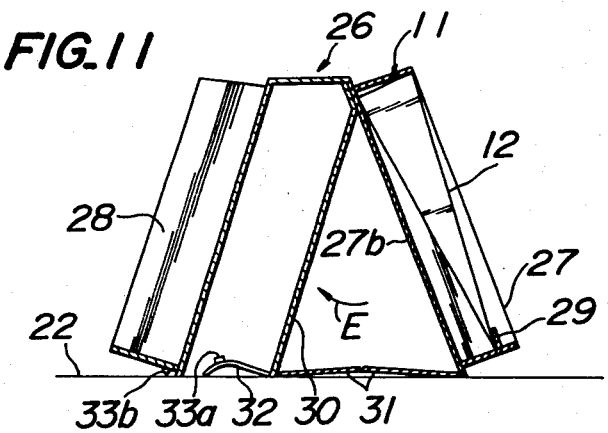
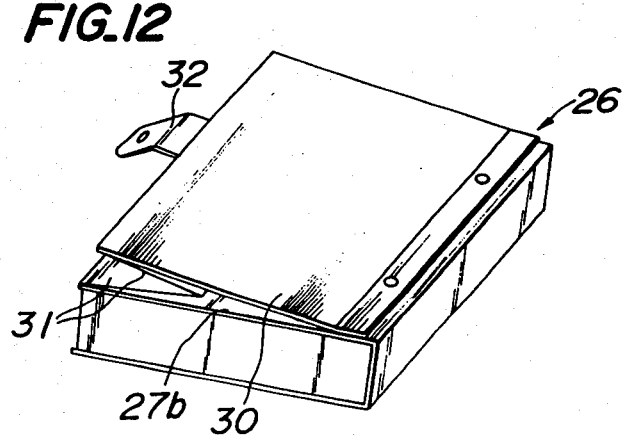

DESKTOP FILM VIEWER

BACKGROUND OF THE INVENTION

1. Field of the Invention

This invention relates to a desktop film viewer, and more particularly to an improvement of a desktop film viewer to facilitate viewing of positive or negative transparencies for checking and retrieving desired ones from a large number of transparencies.

2. Description of the Prior Art

A typical desktop film viewer of the prior art has a horizontal diffusion plate on which a positive or negative transparency to be viewed is placed. Such desktop film viewer of the prior art is useful in viewing separate transparencies, but has shortcomings in that when transparencies stored in a plurality of filing sheets held by a binder is to be viewed, the transparencies have to be drawn out of the filing sheets because the conventional desktop film viewer is not convenient for viewing the filing sheet without separating from the binder, and that the conventional film viewer is not suitable for viewing transparencies held vertically or at a certain inclination. In short, with the prior art, the freedom of choice in the manner of viewing the transparencies is limited.

SUMMARY OF THE INVENTION

Therefore, an object of the present invention is to obviate the above-mentioned shortcomings of the prior art by providing an improved desktop film viewer which allows viewing of films or transparencies in a plurality of filing sheets bound in an album-like binder without requiring the removal of the films or transparencies from the binder.

To fulfil this object, the desktop film viewer of the present invention uses a wedge-shaped box with an inclined top, and a light source is disposed in the thick end of the wedge-shaped box and a diffusion plate is fitted in the inclined top of the wedge-shaped box. A main reflector is provided on the inner surface of the bottom wall of the box, and sub-reflectors are disposed on those tapered portions of the sidewall of the box which have inclined top edges, while a pair of auxiliary reflectors are disposed on opposite sides of said light source at such inclinations that the auxiliary reflectors reflect light beams from the light source toward said main reflector and said sub-reflectors so as to direct the light beams to those portions of said diffusion plate which are distant from the light source, whereby uniform brightness is provided on the diffusion plate. If the above-mentioned reflectors are not used, a large spacing between the diffusion plate and the bottom wall of the wedge-shaped box is necessary in order to provide uniform brightness on the diffusion plate. Accordingly, a comparatively thin wedge-shaped box of the film viewer is provided by the invention, and the film viewer box of the invention can be easily inserted between adjacent filing sheets held by a binder, so as to facilitate lucid viewing of the entire picture of the transparency without requiring removal of the filing sheet from the binder.

A preferred embodiment of the film viewer of the present invention can be used on the top of a desk or table in the same manner as that of conventional film viewers. More particularly, the above-mentioned wedge-shaped box of the film viewer is placed in a casing which has a holding projection adapted to horizontally hold the diffusion plate of the wedge-shaped box, so that transparencies can be placed on the horizontal diffusion plate for viewing through the uniform brightness of the diffusion plate. The holding projection of the casing may be in the form of bosses, a linear projection, or a wedge-like holder.

In another embodiment of the desktop film viewer of the invention, a transparency can be held upstanding at a certain inclination for viewing. More particularly, one edge of a swingable diagonal support plate is secured to the outer surface of the bottom plate of the above-mentioned casing and a foldable limiting member is connected between the opposite free edge of the diagonal support plate and the bottom plate of the casing. When the foldable limiting member is spread and placed on a desk or table, the diffusion plate of the film viewer carried by the casing can be held upstanding at a certain inclination on the desk or table by the upstanding diagonal support plate at the back of the casing.

BRIEF DESCRIPTION OF THE DRAWINGS

For a better understanding of the invention, reference is made to the accompanying drawings, in which:

FIG. 10 is an explanatory diagram of the manner in which the casing of the desktop film viewer is used;

FIG. 11 is a schematic sectional view showing the upstanding condition of the casing; and FIG. 12 is a schematic perspective view showing the folded condition of the casing of the desktop film viewer.

Throughout different views of the drawings, 1 is a rectangular box, 2 is a diffusion plate, 3 is a light source, 4 is a reflector, 5 is a ballast stabilizer, 11 is a wedge-shaped box, 12 is a diffusion plate, 13 is a fluorescent lamp, 14 is a main reflector, 15a and 15b are sub-reflectors, 16a and 16b are auxiliary reflectors, 17 is an electric cord, 18 is a ballast stabilizer, 19 is a picture-carrying transparency, 20 is a mounted slide film, 21 is a binder, 22 is a desk, 23 is a viewing person, 24 is a long film, 25 is a tracing paper, 26 is a casing, 27 is a body, 28 is a lid, 29 is a linear projection, 30 is a diagonal support plate, 31 is a foldable limiting member, 32 is a lug, and 33a and 33b are stopper means.

DESCRIPTION OF THE PREFERRED EMBODIMENTS

Figure 1:
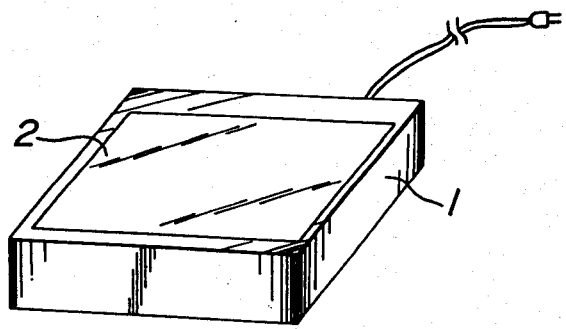
FIG. 1 is a perspective view of a film viewer of the prior art.
Figure 2:
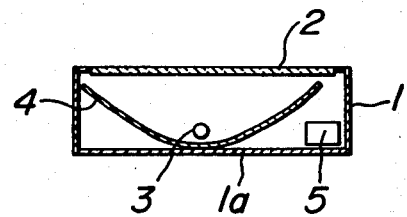
FIG. 2 is a sectional view of the film viewer of FIG. 1.

Before entering the details of the invention, structure of a typical desktop film viewer of the prior art will be briefly reviewed by referring to FIG. 1 and FIG. 2. A rectangular box 1 with a uniform depth has a top which is closed by a diffusion plate 2. A light source 3 such as a fluorescent lamp is fixed at the central portion of inside of the box 1 in the proximity of bottom wall 1a, so that the light source 3 extends in the width direction of the box 1, as shown in FIG. 2. A reflector 4 is disposed in the box 1 for uniformly reflecting the light beams from the light source 3 toward the diffusion plate 2, and a ballast stabilizer 5 is connected to the fluorescent lamp of the light source 3, as shown in FIG. 2.

In the prior art, the depth of the box 1 is determined so as to provide sufficient distance between the light source 3 disposed at the central portion of the bottom wall 1a and the diffusion plate 2 for ensuring uniform brightness throughout the entire top surface thereof, which brightness depends on the direct light beams from the light source 3 and the reflected light beams from the reflector 4. Consequently, the box 1 of the desktop film viewer of the prior art is comparatively deep.

Due to the deepness of the box 1, it has been very difficult for the film viewer of the prior art to view transparencies carried by a binder in an album fashion without removing them from the binder. Besides, it has been difficult to keep the film viewer of the prior art upstanding at a desired inclination during the viewing operation.

Figure 3:
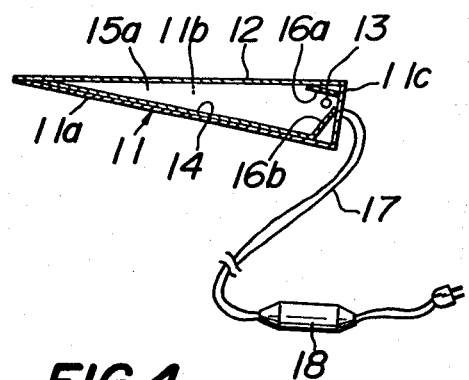
FIG. 3 is a schematic sectional view of a desktop film viewer according to the present invention.

Referring to FIG. 3 showing a sectional view of an embodiment of the desktop film viewer of the invention, a wedge-shaped box 11 has a bottom wall 11a and an inclined top closed by a light-transmitting diffusion plate 12 such as a glass or plastics plate.

Figure 4:
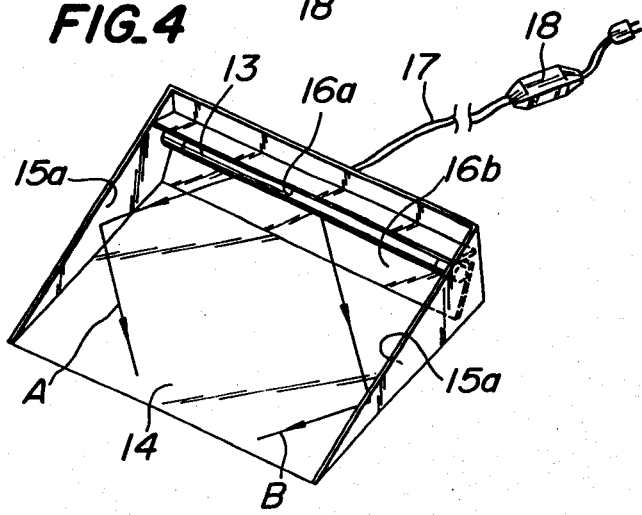
FIGS. 4 and 5 are diagrammatic illustrations of the function of reflectors in the film viewer of the invention.

In this embodiment, a fluorescent lamp 13 forming a light source is disposed along a rectangular portion 11c of the sidewall of the box 11 extending between the bottom wall 11a and the diffusion plate 12. A rectangular portion 11c of the sidewall represents the thicker side of the wedge-shaped box 11, and a fluorescent lamp 13 extends in the width direction of the box 11. A main reflector 14 is mounted on the inner surface of the bottom wall 11a. Sub-reflectors 15a and 15b are mounted on the inner surfaces of tapered or triangular portions 11b of the sidewall as shown in FIGS. 3 and 4. Auxiliary reflectors 16a and 16b are disposed on opposite sides of the light source, or above and below the fluorescent lamp 13 in the embodiment of FIG. 3. The auxiliary reflectors 16a and 16b extend along the rectangular portion 11c of the sidewall of the wedge-shaped box 11, or the above-mentioned thicker side of the sidewall, in such an angular disposition that the light beams from the fluorescent lamp 13 are reflected by the auxiliary reflectors 16a and 16b toward the diffusion plate 12 and the main reflector 14 on the bottom wall 11a and the sub-reflectors 15a and 15b on the triangular portions 11b of the sidewall.

An electric cord 17 supplies electricity to the fluorescent lamp 13 through a ballast stabilizer 18.

Figure 5:
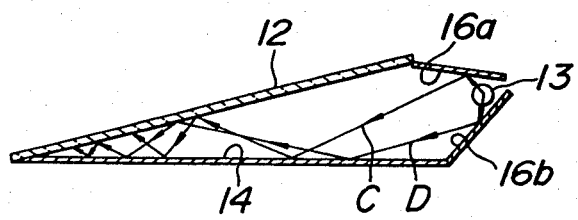

The function of the film viewer of the above-mentioned construction according to the invention will be described now. The light beams emanated directly from the fluorescent lamp 13 and light beams reflected by the main reflector 14 immediately after emanating from the fluorescent lamp 13 pass through the diffusion plate 12 while providing such brightness of the diffusion plate 12 which decreases as the diffusion plate 12 extends away from the fluorescent lamp 13. On the other hand, light beams reflected by the two sub-reflectors 15a and 15b reach those portions of the diffusion plate 12 which are distant from the fluorescent lamp 13, so as to contribute to an increase of the brightness at such portions over that produced by the light beams either directly from the fluorescent lamp 13 or through only the main reflector 14 after emanating from the fluorescent lamp 13, as shown by the arrows A and B of FIG. 4. Besides, light beams reflected by the auxiliary reflectors 16a and 16b are further reflected by the main reflector 14 and the inner surface of the diffusion plate 12, as shown by the arrows C and D of FIG. 5, so as to further increase the brightness at those portions of the diffusion plate 12 which are distant from the fluorescent lamp 13. Whereby, the surface brightness of the diffusion plate 12 is made substantially uniform throughout the entire span thereof.

It is noted here that if the inner surface of the diffusion plate 12 is made flat without any unevenness, such flat surface functions as if it were a reflector for light beams with comparatively large incident angle, so that the reach of the light beams from the fluorescent lamp 13 is further increased. Accordingly, such smooth flat inner surface of the diffusion plate 12 contributes to the further improvement of the uniformity of the surface brightness of the diffusion plate 12.

Figure 6:
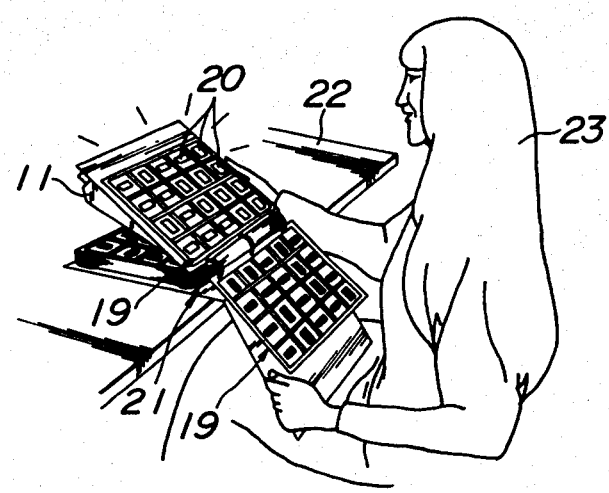
FIGS. 6 and 7 are explanatory diagrams showing the manner in which the film viewer of FIGS. 3 through 5 are used.

FIG. 6 shows the manner in which transparencies are viewed by using the film viewer of FIGS. 3 and 4. A picture-carrying transparency 19 in the figure represents a transparent or translucent filing sheet holding a number of mounted slide films 20 in rows and columns. The picture-carrying transparencies 19 are filed in an album fashion by a binder 21.

To view the picture-carrying transparency 19, the binder 21 is placed on a desk 22, and the desired transparency 19 is slightly turned up toward a viewing person 23 and the thin end of the wedge-shaped box 11 of the film viewer is inserted under the thus turned transparency so as to illuminate the transparency 19 by the light beams from the diffusion plate 12. Since the diffusion plate 12 has uniform brightness throughout the entire span thereof, any mounted slide film 20 carried by the picture-carrying transparency 19 can be clearly viewed, for instance for the sake of checking or retrieval thereof in a very easy manner regardless of the position thereof on the transparency 19.

The wedge-shaped box 11 is light in weight, because only the fluorescent lamp 13 and reflectors are disposed therein, so that the box 11 and the transparency 19 can be easily raised and turned as shown in FIG. 6, until the eyes of the viewing person 23 faces the transparency 19 at right angles. Thus, easy and accurate viewing of the transparency 19 is ensured.

Figure 7:
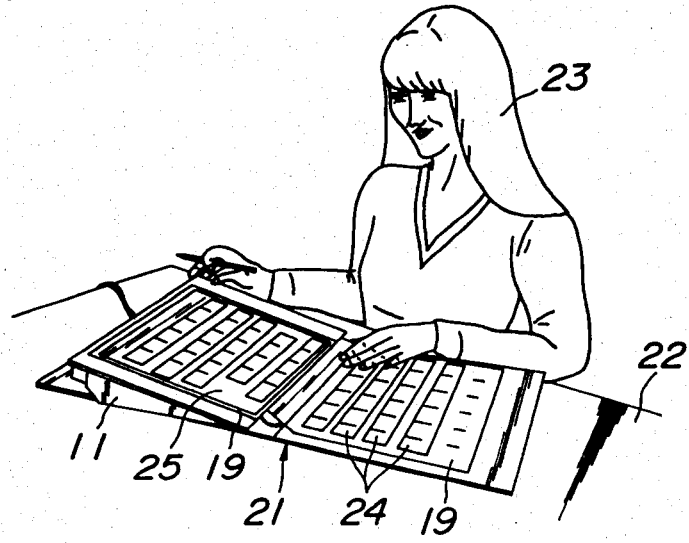

FIG. 7 is an explanatory diagram of another use of the film viewer of the present invention. The picture-carrying transparency 19 of this figure represents a transparent film jacket having a plurality of bag-shaped pockets which hold long negative or positive films 24, and a number of such transparencies 19 are filed by a binder 21. In FIG. 7, the transparency 19 is viewed and the picture of the transparency 19 is traced on a sheet of tracing paper 25 without removing the transparency 19 from the binder 21.

More particularly, the desired picture-carrying transparency 19 is slightly turned up in a counterclockwise direction as seen from the viewing person 23, and the wedge-shaped box 11 is inserted under the thus turned transparency 19 but upon another transparency 19 which is filed just below the thus turned one. The tracing paper 25 is placed on the desired transparency 19, so that any picture carried by the transparency 19 can be traced by using the light beams which emanate from the diffusion plate 12 and pass through the transparency 19. During the tracing, the diffusion plate 12 acts also as a pad, so that the film 24 is protected against scratches or other damages possibly caused by pencils or the like.

Figure 8:
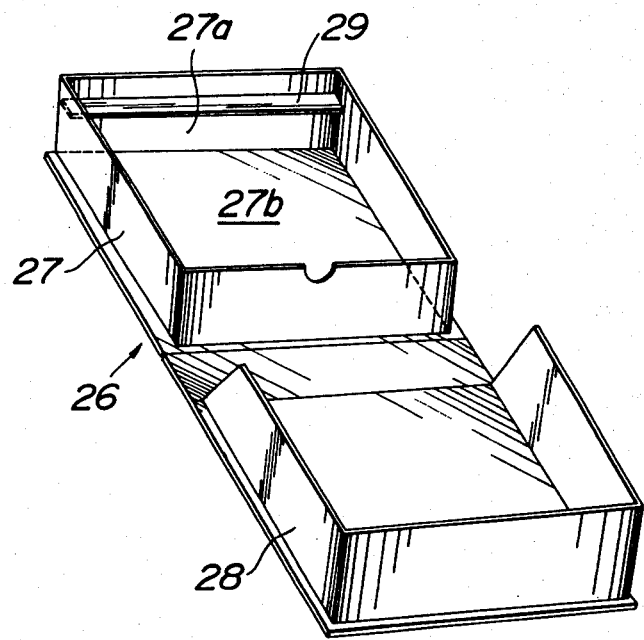
FIG. 8 is a schematic perspective view of a casing of the desktop film viewer of the invention, shown under the spread condition.
Figure 9:
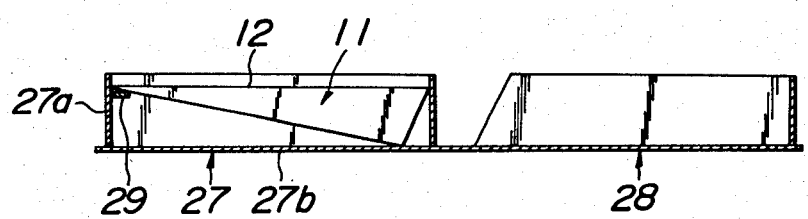
FIG. 9 is a schematic sectional view of the casing of FIG. 8.

FIG. 8 shows a schematic perspective view of a casing 26 for holding the wedge-shaped box 11 of the film viewer of the invention, which casing 26 is shown under the spread condition. The casing 26 comprises a body 27 with an open top and a lid 28 adapted to close the open top of the body 27. The body 27 is deep enough for receiving and holding the wedge-shaped box 11. The lid 28 of the illustrated embodiment has sidewalls which can cover the sidewalls of the body 27 upon folding of the casing 26. The illustrated body 27 is rectangular and one sidewall 27a of the body 27 is adapted to support the thin end of the wedge-shaped box 11 of the film viewer, and a linear projection 29 is secured to the sidewall 27a with a suitable spacing from the bottom plate 27b of the body 27 for holding the thin end of the wedge-shaped box 11 at a desired height from the bottom plate 27b. Referring to FIG. 9, when the wedge-shaped box 11 is placed in the body 27 of the casing 26 with the diffusion plate 12 facing upward, the thin end of the wedge-shaped box 11 rests on the linear projection 29 and the diffusion plate 12 is held horizontal.

Accordingly, when the wedge-shaped box 11 of the film viewer is placed in the casing 26 with the diffusion plate 12 held horizontal, the film viewer of the invention can be used in the same manner as that of the prior art illustrated in FIGS. 1 and 2. More particularly, referring to the left-hand side desktop film viewer of FIG. 10, a picture-carrying transparency 19 or individual mounted slide films 20 can be placed on the diffusion plate 12, and the picture of the transparency 19 or the mounted slide films 20 can be easily and clearly viewed.

When the desktop film viewer of the invention is not used, the box 11 can be stored orderly in the casing 26; namely, the box 11 is placed in the body 27 with the diffusion plate 12 held horizontally as shown in FIG. 9 and the electric cord 17 and the ballast stabilizer 18 are placed between the bottom plate 27b of the body 27 and the box 11, and then the top of the body 27 is covered by the lid 28.

The linear projection 29 is for holding the thin end of the wedge-shaped box 11, so that it can be replaced with bosses, projections of other shapes, or ridges formed on the sidewall 27a, or projections, ridges, or suitable wedge-like members fixed on the bottom plate 27b of the body 27, provided that sufficient mechanical strength is given thereto.

FIG. 11 is a schematic sectional view of another embodiment of the invention, in which one edge of a swingable diagonal support plate 30 is secured to the casing 26 so as to allow the casing 26 to stand by itself with a certain inclination. More particularly, one edge of the diagonal support plate 30 is secured to the outer surface of the bottom plate 27b of the body 27, while allowing the opposite free edge of the diagonal support plate 30 to swing relative to the bottom plate 27b. To restrict the above-mentioned swing of the diagonal support plate 30, a foldable limiting member 31 is connected between the bottom plate 27b and the above-referred free edge of the diagonal support plate 30. A lug 32 is fastened to the free edge of the diagonal support plate 30 in such a manner that, when the desktop film viewer is not used, the lug 32 binds the diagonal support plate 30 and the lid 28 to the body 27 by suitable stopper means 33a and 33b such as a snap set secured to the lug 32 and the lid 28.

To keep the body 27 with the film viewer box 11 held therein at a certain upstanding position, the diagonal support plate 30 is swung away from the bottom plate 27b to a farthest position defined by the foldable limiting member 31, as shown by the arrow E of FIG. 11, and the thus unfolded limiting member 31 is placed on the top of the table 22. If a picture-carrying transparency 19 is overlaid on the diffusion plate 12 of the thus upstanding box 11 in the casing body 27, as shown in the right-hand side desktop film viewer of FIG. 10 the picture-carrying transparency 19 can be clearly viewed at its upstanding position.

When the casing 26 is at the upstanding position, the thin end of the wedge-shaped box 11 may be kept in contact with the inner surface of the linear projection 29 facing the bottom plate 27b of the body 27 as shown in FIG. 11, so that the film viewer box 11 is prevented from accidental slipping out of the body 27. Besides, the sidewall 27a of the body 27 can be conveniently used for holding the picture-carrying transparency 19.

FIG. 12 is a schematic perspective view showing the casing 26 as folded. The foldable limiting member 31 is folded inwardly from the position of FIG. 11 while turning the diagonal support plate 30 in a direction opposite to the arrow E of the figure, and the lid 28 is turned onto the body 27 in FIG. 12 so as to close the casing 26. The lug 32, which is at a free position in FIG. 12, is provided with the stopper means 33a such as a part of a snap set, so as to detachably fasten the lug 32 to the outside surface of the lid 28 having a coacting stopper means 33b. Thus, the casing 26 is folded in a compact form by connecting the thus turned lid 28 to the body 27 with the lug 32 secured to the diagonal support plate 30. After being folded, the casing 26 can be easily stored in an orderly fashion.

Referring to FIG. 10, when one casing 26 with the film viewer box 11 is spread flat in the manner as shown in FIG. 9 and another casing 26 with the film viewer box 11 is held upstanding in the manner as shown in FIG. 11 and the two casings 26 are placed side by side on the desk 22, a number of mounted slide films 20 placed at random on the diffusion plate 12 of the flat casing 26 on the left-hand side of FIG. 10 can be selected one by one and placed in a filing sheet of the picture-carrying transparency 19 on the diffusion plate 12 of the upstanding casing 26 on the right-hand side of the figure in an easy and orderly fashion while allowing the checking of the orientations and the relative positions of the individual mounted slide films 20 in the filing sheet.

As described in the foregoing, the film viewer according to the present invention is characterized by using a wedge-shaped box of light weight with a diffusion plate secured to the top thereof and reflectors disposed therein so as to render uniform brightness throughout the entire span of the diffusion plate, whereby the film viewer can be inserted between adjacent picture-carrying transparencies filed in an album fashion for the purpose of viewing the transparency facing the diffusion plate of the film viewer. The present invention provides for the desktop use of the film viewer box by using a casing, which casing has a linear projection and is adapted to receive the film viewer box while holding the diffusion plate thereof horizontal by supporting one end of the diffusion plate with the linear projection, whereby various kinds of transparencies and mounted slide films can be placed on the horizontal diffusion plate for viewing in the manner similar to that of the prior art. Furthermore, the desktop film viewer of the invention can be held upstanding by mounting a diagonal support plate and a foldable limiting member of FIG. 11 to the casing, so as to further improve the ease of viewing the transparencies at the upstanding position.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. A film viewer, comprising a wedge-shaped box having a bottom wall, an inclined top with a diffusion plate fitted therein so as to face the bottom wall, and a sidewall enclosing a space between the bottom wall and the top, said sidewall including a rectangular portion defining largest spacing from the bottom wall to the top and two opposing tapered portions extending away from the rectangular portion; a light source fixed in said box in the proximity of said rectangular portion of the sidewall so as to illuminate said diffusion plate; a main reflector fixed to inside surface of said bottom wall; sub-reflectors fixed to the inside surfaces of said tapered portions of the sidewall; and a pair of auxiliary reflectors disposed on opposite sides of said light source at such inclinations that the auxiliary reflectors reflect light beams from the light source toward said main reflector and said sub-reflectors so as to direct the light beams toward those portions of said diffusion plate which are distant from the light source, whereby uniform brightness is provided on the diffusion plate.

2. A desktop film viewer, comprising a wedge-shaped box having a bottom wall, an inclined top with a diffusion plate fitted therein so as to face the bottom wall, and a sidewall enclosing a space between the bottom wall and the top, said sidewall including a rectangular portion defining largest spacing from the bottom wall to the top and two opposing tapered portions extending away from the rectangular portions; a light source fixed in said box in the proximity of said rectangular portion of the sidewall so as to illuminate said diffusion plate; a main reflector fixed to inside surface of said bottom wall; sub-reflectors fixed to the inside surfaces of said tapered portions of the sidewall; a pair of auxiliary reflectors disposed on opposite sides of said light source at such inclinations that the auxiliary reflectors reflect light beams from the light source toward said main reflector and said sub-reflectors so as to direct the light beams toward those portions of said diffusion plate which are distant from the light source, whereby uniform brightness is provided on the diffusion plate; a casing with a bottom plate and an open end facing the bottom plate, said casing being adapted to receive said box therein through said open end; and a holding projection formed on inside surface of said casing so as to engage a thin end of said wedge-shaped box for holding said diffusion plate of the box substantially in parallel with said bottom plate of the casing.

3. An inclinable desktop film viewer, comprising a wedge-shaped box having a bottom wall, an inclined top with a diffusion plate fitted therein so as to face the bottom wall, and a sidewall enclosing a space between the bottom wall and the top, said sidewall including a rectangular portion defining largest spacing from the bottom wall to the top and two opposing tapered portions extending away from the rectangular portion; a light source fixed in said box in the proximity of said rectangular portion of the sidewall so as to illuminate said diffusion plate; a main reflector fixed to inside surface of said bottom wall; sub-reflectors fixed to inside surfaces of said tapered portions of the sidewall; a pair of auxiliary reflectors disposed on opposite sides of said light source at such inclinations that the auxiliary reflectors reflect light beams from the light source toward said main reflector and said sub-reflectors so as to direct the light beams toward those portions of said diffusion plate which are distant from the light source, whereby uniform brightness is provided on the diffusion plate; a casing with a bottom plate and an open end facing the bottom plate, said casing being adapted to receive said box therein through said open end; a swingable diagonal support plate having one edge thereof secured to outer surface of said bottom plate of said casing; and a foldable limiting member connected between said bottom plate of the casing and free edge of said swingable diagonal support plate, whereby upon swinging said support plate away from said bottom plate of the casing by unfolding said limiting member, said support plate holds the casing as upstanding on said limiting member at a certain inclination.

4. An inclinable desktop viewer as set forth in claim 3, further comprising a holding projection formed on inside surface of said casing so as to engage a thin end of said wedge-shaped box for holding said diffusion plate of the box substantially in parallel with said bottom plate of said casing.

5. An inclinable desktop film viewer as set forth in claim 3, further comprising a lug secured to the free end of said swingable diagonal support plate, and a stopper means mounted on said lug, said stopper means being adapted to detachably secure said free edge of the diagonal support plate to said casing when said foldable limiting member is folded.

* * * * *